US009170805B2

(12) United States Patent
Yoshimura et al.

(10) Patent No.: US 9,170,805 B2
(45) Date of Patent: Oct. 27, 2015

(54) SOFTWARE MAINTENANCE SUPPORTING DEVICE FOR ANALYZING RELATIONSHIPS BETWEEN VARIABLES

(75) Inventors: Kentaro Yoshimura, Yokohama (JP); Takeshi Fukuda, Hitachi (JP); Yoshitaka Atarashi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 21 days.

(21) Appl. No.: 13/808,152

(22) PCT Filed: Jul. 20, 2010

(86) PCT No.: PCT/JP2010/004635
§ 371 (c)(1),
(2), (4) Date: Jan. 3, 2013

(87) PCT Pub. No.: WO2012/011145
PCT Pub. Date: Jan. 26, 2012

(65) Prior Publication Data
US 2013/0111438 A1   May 2, 2013

(51) Int. Cl.
G06F 9/44 (2006.01)
G06F 11/36 (2006.01)

(52) U.S. Cl.
CPC .. *G06F 8/70* (2013.01); *G06F 8/75* (2013.01); *G06F 11/3604* (2013.01)

(58) Field of Classification Search
None
See application file for complete search history.

(56) References Cited

U.S. PATENT DOCUMENTS

| 6,110,224 A * | 8/2000 | Kawabe et al. ............... 717/131 |
| 2002/0162089 A1* | 10/2002 | Lewis et al. .................. 717/106 |
| 2004/0122860 A1* | 6/2004 | Srinivasan ................ 707/104.1 |
| 2004/0226006 A1* | 11/2004 | Russell ......................... 717/154 |
| 2005/0204344 A1* | 9/2005 | Shinomi ....................... 717/124 |
| 2008/0052685 A1* | 2/2008 | Jeong et al. .................. 717/136 |
| 2008/0148225 A1* | 6/2008 | Sarkar et al. ................. 717/107 |
| 2008/0155508 A1* | 6/2008 | Sarkar et al. ................. 717/126 |
| 2008/0163187 A1* | 7/2008 | Loff ............................... 717/168 |
| 2008/0184196 A1* | 7/2008 | Kataoka ....................... 717/107 |
| 2009/0312991 A1* | 12/2009 | Hirata ............................. 703/2 |
| 2010/0063785 A1* | 3/2010 | Pich et al. ........................ 703/6 |
| 2010/0083185 A1* | 4/2010 | Sakai ............................ 715/853 |
| 2010/0199257 A1* | 8/2010 | Biggerstaff .................. 717/104 |

(Continued)

FOREIGN PATENT DOCUMENTS

| JP | 7-141166 A | 6/1995 |
| JP | 8-190475 A | 7/1996 |
| JP | 9-274562 A | 10/1997 |
| JP | 2001-273169 A | 10/2001 |
| JP | 2001-325100 A | 11/2001 |

(Continued)

OTHER PUBLICATIONS

International Search Report with English translation dated Oct. 26, 2010 (four (4) pages).

*Primary Examiner* — Insun Kang
(74) *Attorney, Agent, or Firm* — Crowell & Moring LLP

(57) ABSTRACT

The invention relates to a software maintenance supporting device that analyzes and displays the structure of software, and its object is to divide software into clusters including plural variables and illustrate the result of the division. The software maintenance supporting device extracts variable dependence relation data from a source code, and divides software into clusters including plural variables, using a variable dependence relation. Also, an inter-variable dependence relation is illustrated as a directed graph in which a variable is expressed as a node and a dependence relation is expressed as a link, and variables belonging to the same cluster are highlighted.

13 Claims, 10 Drawing Sheets

(56) References Cited

U.S. PATENT DOCUMENTS

2010/0242027 A1* 9/2010 Duplessis et al. ............ 717/128
2011/0239204 A1* 9/2011 Sukumaran et al. .......... 717/157

FOREIGN PATENT DOCUMENTS

| | | |
|---|---|---|
| JP | 2006-323480 A | 11/2006 |
| JP | 2009-205289 A | 9/2009 |

* cited by examiner

FIG. 4

| LINK ID | VARIABLE NAME (START POINT) | VARIABLE NAME (END POINT) |
|---|---|---|
| 1 | a | b |
| 2 | a | c |
| 3 | b | d |
| 4 | c | d |
| 5 | d | e |
| 6 | e | f |
| 7 | e | g |

| START POINT \ END POINT | a | b | c | d | e | f | g |
|---|---|---|---|---|---|---|---|
| a | 0 | 1 | 1 | 0 | 0 | 0 | 0 |
| b | 0 | 0 | 0 | 1 | 0 | 0 | 0 |
| c | 0 | 0 | 0 | 1 | 0 | 0 | 0 |
| d | 0 | 0 | 0 | 0 | 1 | 0 | 0 |
| e | 0 | 0 | 0 | 0 | 0 | 1 | 1 |
| f | 0 | 0 | 0 | 0 | 0 | 0 | 0 |
| g | 0 | 0 | 0 | 0 | 0 | 0 | 0 |

| SELECT | START POINT \ END POINT | a | b | c | d | e | f | g |
|---|---|---|---|---|---|---|---|---|
|  | a | 0 | 1 | 1 | 0 | 0 | 0 | 0 |
| ✓ | b | 0 | 0 | 0 | 1 | 0 | 0 | 0 |
| ✓ | c | 0 | 0 | 0 | 1 | 0 | 0 | 0 |
| ✓ | d | 0 | 0 | 0 | 0 | 1 | 0 | 0 |
| ✓ | e | 0 | 0 | 0 | 0 | 0 | 1 | 1 |
| ✓ | f | 0 | 0 | 0 | 0 | 0 | 0 | 0 |
| ✓ | g | 0 | 0 | 0 | 0 | 0 | 0 | 0 |

~1131

| LINK ID | VARIABLE NAME (START POINT) | VARIABLE NAME (END POINT) |
|---|---|---|
| 1 | a | b |
| 2 | a | c |
| 3 | b | d |
| 4 | c | d |
| 5 | d | e |
| 6 | e | f |
| 7 | e | g |

1161

| CLUSTER NAME | VARIABLE NAME |
|---|---|
| CLUSTER 1 | a, b, c, d |
| CLUSTER 2 | e, f, g |

1162

| LINK ID | START POINT | END POINT | LINK VARIABLE |
|---|---|---|---|
| 101 | CLUSTER 1 | CLUSTER 2 | d |

1171

| VARIABLE NAME | DEGREE OF IMPORTANCE (DEGREE CENTRALITY) |
|---|---|
| a | 2 |
| b | 2 |
| c | 2 |
| d | 3 |
| e | 3 |
| f | 1 |
| g | 1 |

1172

| VARIABLE NAME | DEGREE OF IMPORTANCE (Rank) |
|---|---|
| a | 0.14 |
| b | 0.14 |
| c | 0.14 |
| d | 0.20 |
| e | 0.22 |
| f | 0.08 |
| g | 0.08 |

MODULARITY = 0.3

SOFTWARE MAINTENANCE SUPPORTING DEVICE FOR ANALYZING RELATIONSHIPS BETWEEN VARIABLES

TECHNICAL FIELD

The present invention relates to a software maintenance supporting device and an electronic control device verified by the same.

BACKGROUND ART

In the fields of elevators, automobiles, construction machinery and the like, an embedded control device which controls a control target with so-called embedded software is used. As advantages of embedded software, the ability to realize more flexible and advanced control than in a conventional method using on a mechanical system or electric circuit and the ability to develop many variation products by partial change in the software can be mentioned.

Such an embedded control device, for example, an elevator control device employs a so-called data-driven computation model in which a task is started on a predetermined cycle or according to an interrupt and control variables are updated based on an input from a destination floor designation button or a sensor such as door safety sensor, thus controlling an actuator such as door open/close motor or cage drive motor.

Meanwhile, there is a problem that as control processing which is required of the embedded control device becomes complicated year by year, the dependence relation between control variables becomes more complicated, making the software difficult to understand.

For example, in the case of control software updated with several thousand variables, if the operation method of a variable at one site is changed, it is essential to specify variables which are influenced by the change and thus verify the software.

Patent Document 1, mentioned below, discloses an example of a business-use software maintenance supporting device which makes analysis based on the data type of variables. This software maintenance supporting device divides the type of data into domains such as "date data" based on variable definitions and a determination text on the source code, analyzes the relation between the domains, and displays the software structure.

Patent Document 2, mentioned below, discloses an example of a software maintenance supporting device which highlights a processing content related to a variable which the user focuses on. The processing content of a specific function is illustrated and a processing block related to the variable which the user focuses on is clarified in cooperation by a technique such as bold-line display.

RELATED ART DOCUMENTS

Patent Documents

Patent Document 1: JP-A-9-274562
Patent Document 2: JP-A-2006-323480

SUMMARY OF THE INVENTION

Problems that the Invention is to Solve

If the technique described in the above Patent Document 1 is applied to control software, particularly to software in which control is performed using the state of an ON/OFF switch as an input as in an elevator, most variables are classified into the same domain (ON/OFF type). Therefore, there is a problem that the technique is not considered as analysis support.

In the technique described in the above Patent Document 2, the relation of influence between plural functions and files cannot be analyzed and displayed.

In order to the problems as described above, an object of the invention is to provide a software structure analyzing and visualizing device for software for electronic control device.

Means for Solving the Problems

An embedded control device according to the invention has disclosed data and stored data, as control data that is disclosed with respect to a data reference component. Also, based on which of an execution priority of a data disclosure source component and an execution priority of the data reference component is higher, which data the data reference component refers to is switched between the disclosed data and the stored data.

That is, a software maintenance supporting device according to the invention includes source code analysis means for analyzing a source code of software loaded in an electronic control device to control a control target, and outputs analysis information related to a variable in the source code, wherein the source code analysis means includes variable dependence relation analysis means for recognizing another variable to be referred to when calculating the variable, and extracting variable dependence relation data, and variable dependence relation network analysis means having variable cluster analysis means for extracting variable cluster data in which a set of all variables is divided into variable clusters including at least one variable, based on the variable dependence relation data, and the device includes variable dependence relation display means for illustrating an inter-variable dependence relation as a directed graph in which variables are expressed as nodes and the dependence relation is expressed as a link, based on the variable dependence relation data, and highlighting variables belonging to the same cluster based on the variable cluster data.

Then, the variable dependence relation display unit displays a modularity index calculated based on the number of variable dependence relations within the divided clusters and the number of variable dependence relations between the clusters, based on the variable cluster data.

Also, the variable dependence relation display unit displays variables belonging to the same variable cluster in the same color, based on the variable cluster data.

Also, the variable dependence relation display unit illustrates a cluster dependence relation network in which the variable cluster is expressed as a node and a variable dependence relation between variable clusters is expressed as a link, based on the variable dependence relation data and the variable cluster data.

Also, the variable dependence relation display unit displays a variable name to be a start point of a link expressing a variable dependence relation between variable clusters, on the link.

Also, the variable dependence relation display unit illustrates a variable dependence relation between variables belonging to the same variable cluster, within the cluster, based on the variable dependence relation data and the variable cluster data.

Also, the variable dependence relation display unit illustrates a variable with a high degree of importance in a size equal to or greater than a variable with a low degree of importance, based on the variable importance degree data.

Also, the variable dependence relation display unit changes a display color according to a value of the degree of importance, based on the variable importance degree data.

Also, the variable dependence relation network analysis means includes variable importance degree analysis means for extracting variable importance degree data indicating the degree of importance of each variable, based on the variable dependence relation data.

Also, the source code analysis means includes analysis target setting means for selecting a variable to be an analysis target.

Also, the variable cluster analysis means includes cluster analysis technique selecting means for selecting at least one cluster analysis technique of link betweenness centrality community analysis and eigenvector communication analysis.

Also, the variable importance degree analysis means includes importance degree analysis technique selecting means for selecting at least one analysis technique of degree centrality, transition probability matrix eigenvector centrality, and eigenvector centrality.

Moreover, the software maintenance supporting device according to the invention includes a source code compiler device which carries out conversion to executable software based on the source code.

Also, an electronic control device such as an elevator control device according to the invention includes the software maintenance supporting device according to the invention and transferring executable software.

Advantages of the Invention

With the software maintenance supporting device according to the invention, a processing structure of software can be illustrated, even of control software involving plural files and plural functions.

BRIEF DESCRIPTION OF THE DRAWINGS

FIG. 4 It is a view showing the configuration of variable dependence relation data 112.

FIG. 5 It is a view showing the configuration of variable dependence relation data 112.

FIG. 6 It is a view showing the configuration of analysis target setting 113.

MODE FOR CARRYING OUT THE INVENTION

Hereinafter, examples of the invention will be described.

Examples

Figure 1:
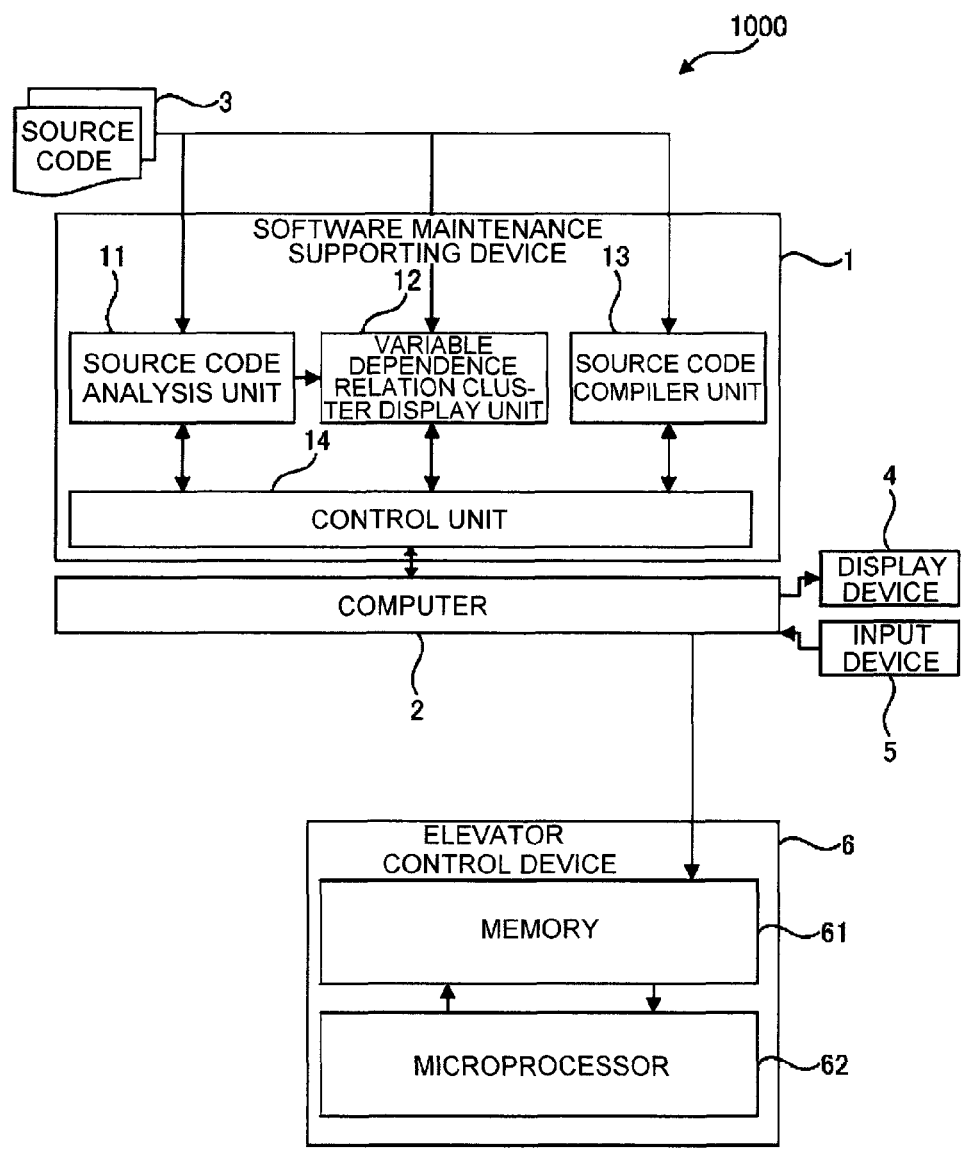
FIG. 1 It is a configuration view of a software maintenance supporting device 1 according to Embodiment 1.

FIG. 1 is a configuration view of a software maintenance supporting device according to an embodiment of the invention and an electronic control device verified by the same 1000. The software maintenance supporting device and the electronic control device verified by the same 1000 include a software maintenance supporting device 1, a computer 2 which executes the software maintenance supporting device 1, a source code 3 of software loaded in an electronic control device, a display device 4 which presents the execution status of the software maintenance supporting device 1 to a user, an input device 5 which the user uses to give an instruction to the software maintenance supporting device 1, and an elevator control device 6 which is an electronic control device used to control an elevator.

The software maintenance supporting device 1 has a source code analysis unit 11 which analyzes a variable dependence relation cluster based on the source code 3, a variable dependence relation cluster display unit 12 which illustrates the variable dependence relation cluster, a source code complier unit 13 which compiles and converts the source code 3 to executable software, and a control unit 14 which controls operations of the entire device.

The elevator control device 6 has a memory 61 which stores the executable software, and a microprocessor 62 which executes the executable software.

Figure 2:
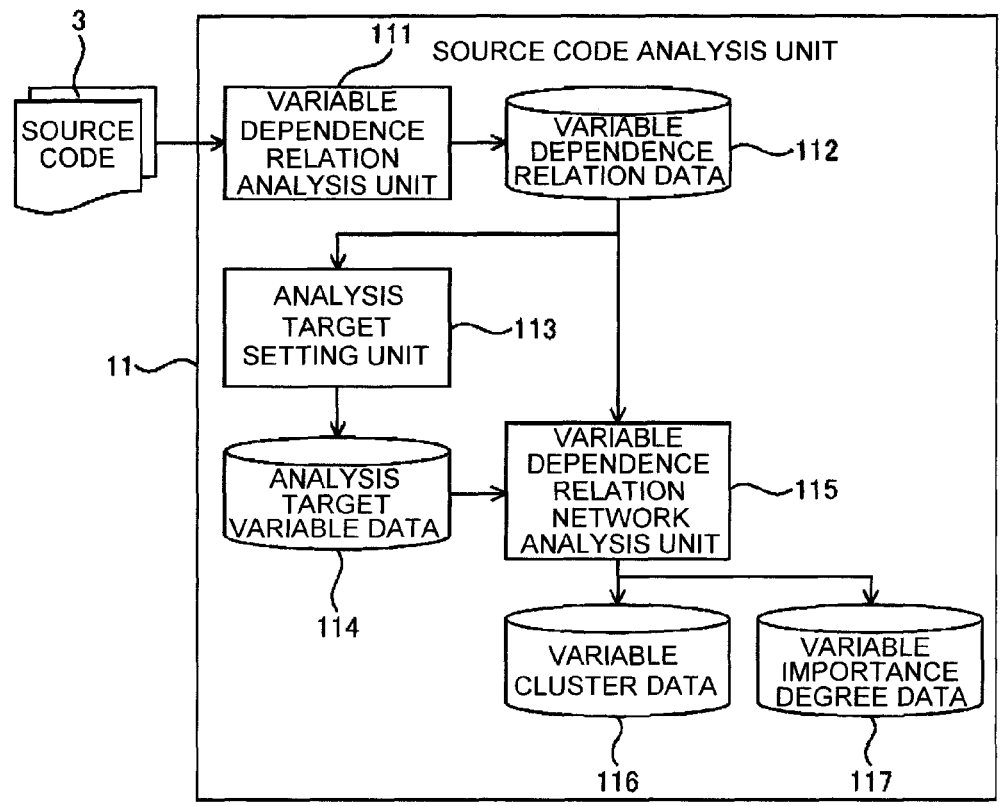
FIG. 2 It is a view showing the configuration of a source code analysis unit 11.

FIG. 2 is a view showing the detailed configuration of the source code analysis unit 11. The source code analysis unit 11 has a variable dependence relation analysis unit 111 which analyzes an inter-variable dependence relation in variable update processing when executing the software based on the source code 3, variable dependence relation data 112 which is a result of the analysis by the variable dependence relation analysis unit 111, an analysis target setting unit 113 which selects a variable to be an analysis target based on the variable dependence relation data 112 and a user's operation on the input device 5, analysis target variable data 114 which is a result of the setting by the analysis target setting unit 113, a variable dependence relation network analysis unit 115 which analyzes a variable dependence relation network in the source code 3 based on either the variable dependence relation data or the analysis target variable data and analyzes a variable cluster and variable importance degree, and variable cluster data 116 and variable importance degree data 117 which are an output from the variable dependence relation network analysis unit 115.

Figure 3:
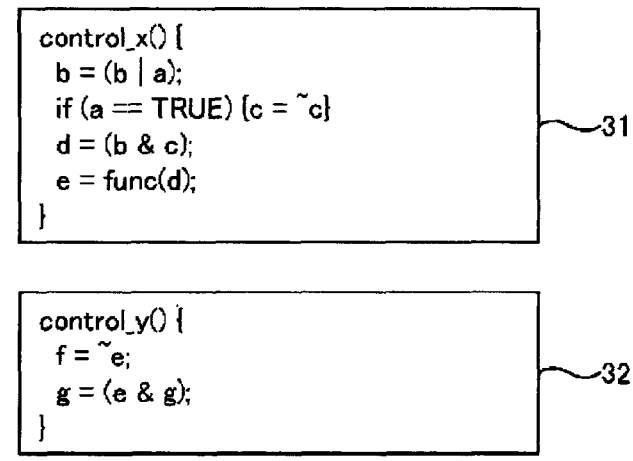
FIG. 3 It is a view showing the configuration of a source code 3.

FIG. 3 is a view showing details of the source code 3. The source code 3 is made up of a source file 31 in which a processing procedure of a function x is described, and a source file 32 in which a processing procedure of a function y is described. Here, variables a, b, c, d, e, f, g used in the source file 31 and the source file 32 are defined as global variables.

In the source file 31, processing to update the variables b, c, d, and e is carried out using the variable a as an input in the function x.

In the source file 32, processing to update the variables f and g is carried out using the variable e as an input in the function y.

FIG. 4 is a view showing a variable dependence relation link table 1121, which is the detailed configuration of the variable dependence relation data 112 extracted by the variable dependence relation analysis unit 111 based on the source file 31 and the source file 32. The variable dependence relation link table 1121 includes link IDs, variables names (start points) and variable names (end points) and shows variable dependence relations. For example, a link ID 1 has a as a variable name (start point) and b as a variable name (end point). It is shown that, on the link ID 1, arithmetic operation is carried out with reference to the variable a when updating the variable b. This corresponds to the second line "b=(b|a);" in the source file 31. Also, a link ID 3 has b as a variable name (start point) and d as a variable name (end point), and a link ID 4 has c as a variable name (start point) and d as a variable name (end point). It is shown that, on the link IDs 3 and 4, arithmetic operation is carried out with reference to the variable b and the variable c when updating the variable d. This corresponds to the fourth line "d=(b&c);" in the source file 31.

FIG. 5 is a view showing a variable dependence relation link matrix 1122, which is another form of the detailed configuration of the variable dependence relation data 112 extracted by the variable dependence relation analysis unit 111 based on the source file 31 and the source file 32. The variable dependence relation link matrix 1122 expresses links having a variable name to be a start point and a variable name to be an end point, in the form of a matrix. For example, an element having a as a start point and b as an end point is expressed as "1", which indicates that arithmetic operation is carried out with reference to the variable a when updating the variable b. Also, an element having a as a start point and d as an end point is expressed as "0", which indicates that arithmetic operation is carried out without referring to the variable a when updating the variable d.

FIG. 6 is a view showing a setting screen 1131 of the analysis target setting unit 113. On this screen, the user checks and thus selects a variable to be an analysis target in the variable dependence relation network. For example, the setting screen 1131 shows that the variable a is eliminated from analysis targets and that the variables b, c, d, e, f, g are analysis targets in the variable dependence relation network.

Figures 7, 8:
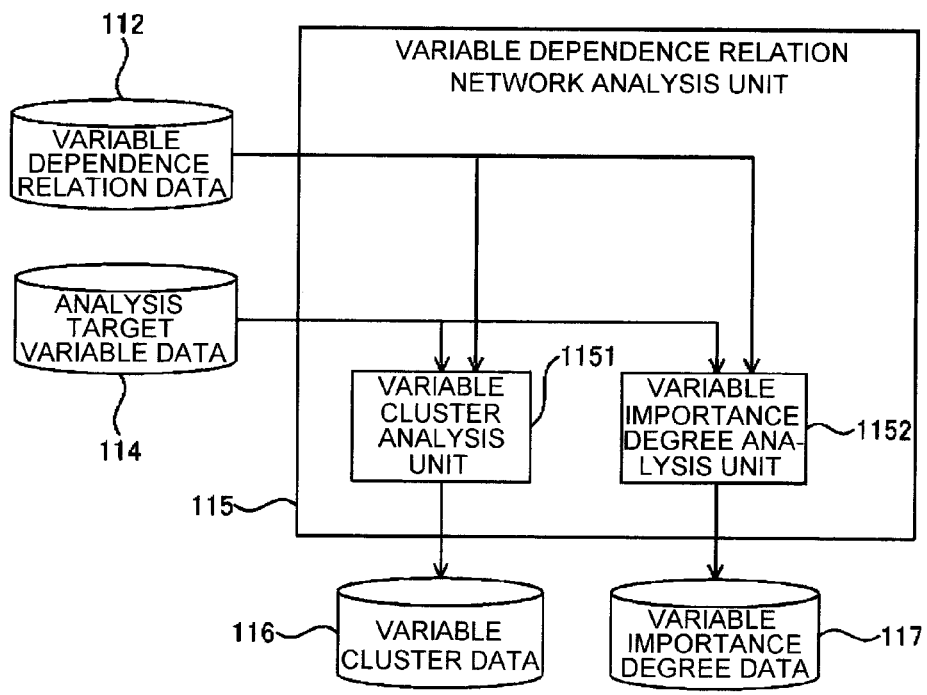
FIG. 7 It is a view showing the configuration of analysis target data 114.
FIG. 8 It is a view showing the configuration of a variable dependence relation network analysis unit 115.

FIG. 7 is a view showing an analysis target variable table 1141, which is the detailed configuration of the analysis target variable data 114 selected by the analysis target setting unit 113. The analysis target variable table 1141 is analysis target variable data in the case where the variables a, b, c, d, e, f, g are designated as analysis targets by the analysis target setting unit 113.

FIG. 8 is a view showing the detailed configuration of the variable dependence relation network analysis unit 115. The variable dependence relation network analysis unit 115 has a variable cluster analysis unit 1151 which extracts the variable cluster data 116 representing the modular configuration of a variable having a high degree of coupling and a low degree of cohesion, based on the variable dependence relation data 112 or the analysis target variable data 114, and a variable importance degree analysis unit 1152 which extracts the variable importance degree data 117 indicating degree of importance of a variable, based on the variable dependence relation data 112 or the analysis target variable data 114.

Figure 9:
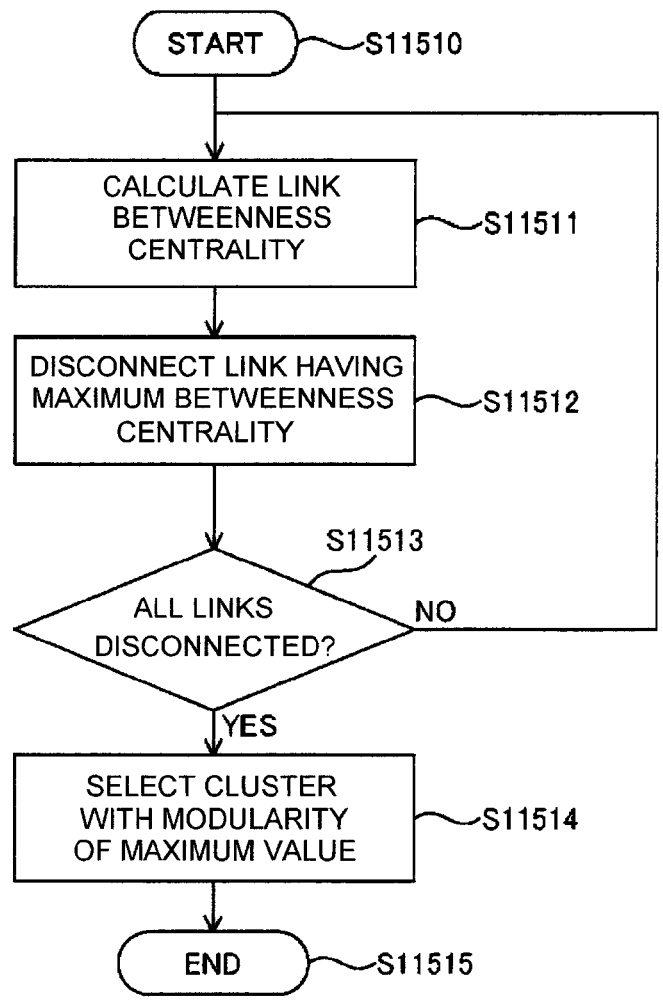
FIG. 9 It is a view showing a cluster analysis execution flow executed at a variable cluster analysis unit 1151.

FIG. 9 is a view showing a detailed execution flow of the variable cluster analysis unit 1151. Here, the variable cluster analysis shown in FIG. 9 is an execution flow in the case where link betweenness centrality community analysis (Newman method) is used, but eigenvector community analysis may also be used. Processing starts in step S11510. In step S11511, calculation of link betweenness centrality indicating the frequency at which a certain link exists on the shortest path between variables is executed with respect to all the links. In step S11512, a link having link betweenness centrality of a maximum value is disconnected. In step S11513, whether all the links are already disconnected or not is determined. If all the links are already disconnected, the processing goes to step S11514. If there is a remaining link, the processing goes back to step S11511. In step S11514, an index of modularity indicating the nature of a module having a high degree of coupling and a low degree of cohesion is calculated for each link division pattern, and a link division pattern having the highest modularity is employed as a variable cluster.

Modularity is calculated in the following manner. When a variable dependence relation network is divided into k clusters, a matrix $e=(e_{ij})$ indicating the relations of k×k clusters is created. The $e_{ij}$ is the proportion at which the number of variable dependence relations held between variables classified into a cluster i and variables classified into a cluster j occupies the dependence relations in the entire variable dependence relation network. Also, a row sum a of e is calculated as follows.

$$a_i = \sum_j e_{ij} \qquad \text{[Equation 1]}$$

Then, modularity Q is formulated as follows.

$$Q = \sum_i (e_{ii} - a_i^2) \qquad \text{[Equation 2]}$$

For example, if a symmetric matrix e is later found based on the result of cluster division shown in FIG. 12 as a division pattern, e is expressed as follows.

$$e = \frac{1}{7}\begin{pmatrix} 4 & 1 \\ 0 & 2 \end{pmatrix} \qquad \text{[Equation 3]}$$

In this case, modularity is calculated as approximately 0.3 (0.2653 . . . ).

Figure 10:
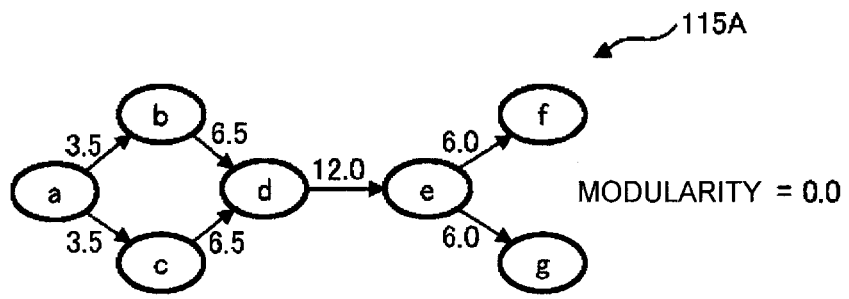
FIG. 10 It is a view showing a variable dependence relation network 115A before link disconnection.

FIG. 10 illustrates a variable dependence relation network 115A. This is based on a directed graph drawing method. The variables a, b, c, d, e, f, g are expressed as nodes and link information designated in the analysis target variable table 1141 is expressed as the link between the nodes. Moreover, above each link, the betweenness centrality index of the link is described. Also, the modularity index is shown as "modularity=0.0" beside the network chart.

Figures 11, 12, 13:
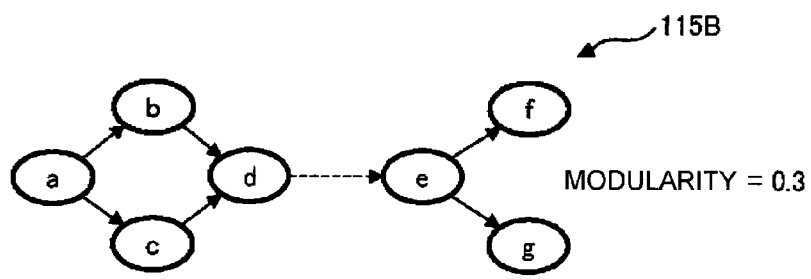
FIG. 11 It is a view showing a variable dependence relation network 115B after link disconnection.
FIG. 12 It is a view showing the configuration of variable cluster data 116.
FIG. 13 It is a view showing the configuration of variable cluster data 116.

FIG. 11 illustrates a variable dependence relation network 115B in which the link is disconnected. This is based on a directed graph drawing method. The variables a, b, c d, e, f, g are expressed as nodes and link information designated in the analysis target variable table 1141 is expressed as the link between the nodes. Also, this is a link having the highest link betweenness centrality in the variable dependence relation network 115A described in FIG. 10. The link "d→e" is shown as a dotted line, indicating that the link is disconnected. Also, the modularity index is shown as "modularity=0.3" beside the network chart. By the way, in the cluster analysis based on the analysis target variable table 1141, the division pattern shown in the variable dependence relation network 115B has the maximum value of modularity. Therefore, this division pattern is the result of cluster division.

FIG. 12 is a view showing a variable cluster table 1161, which is the detailed configuration of the variable cluster data 116. The variable cluster table 1161 shows that a cluster 1 includes the variables a, b, c, d and that a cluster 2 includes the variables e, f, g.

FIG. 13 is a view showing an inter-variable cluster link table 1162, which is the detailed configuration of the variable cluster data 116. It is shown that a link ID 101 is a link having the cluster 1 as a start point and the cluster 2 as an end point, and that the variable corresponding to the link is d. This is because as the variable d is classified into the cluster 1 and the variable e is classified into the cluster 2 by the cluster division, the link with a link ID 5 in the analysis target variable table 1141 is a link across clusters and the variable to be the start point at that time is d.

Figure 14:
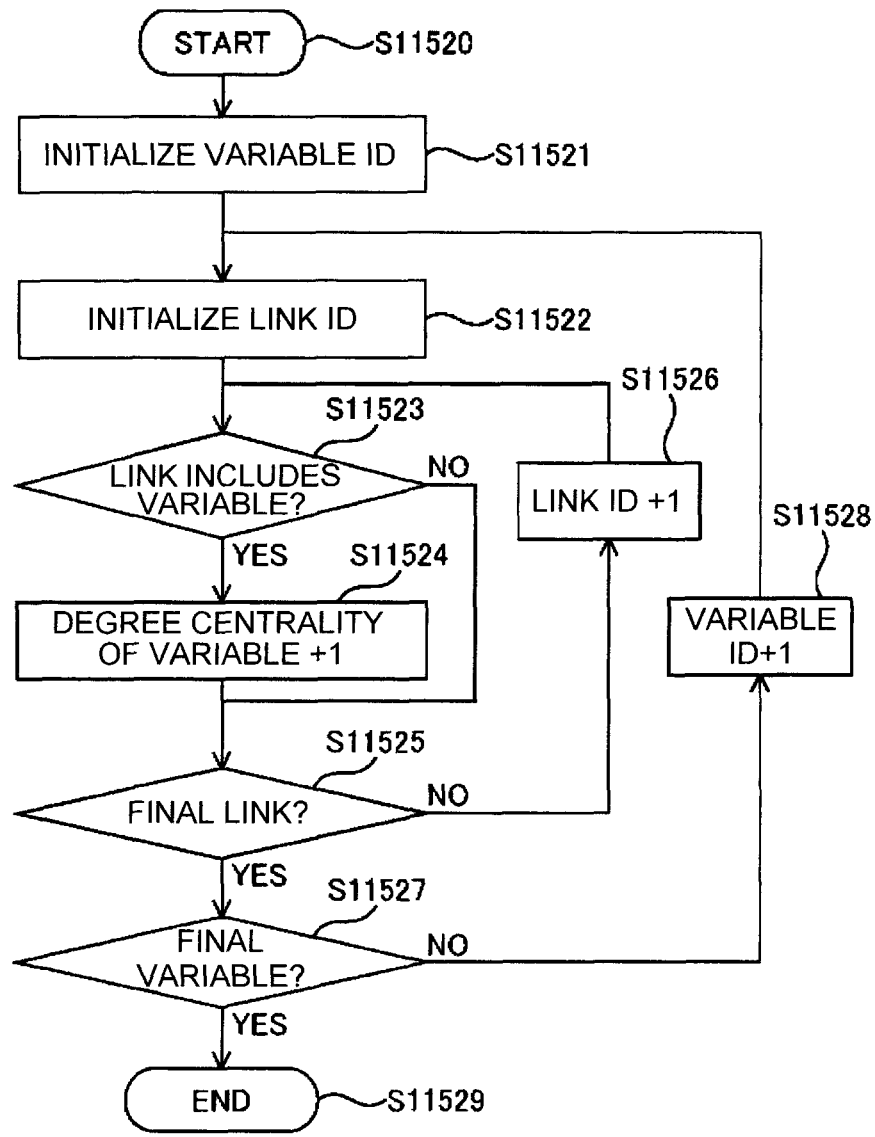
FIG. 14 It is a view showing a variable importance degree analysis execution flow executed at a variable importance degree analysis unit 1152.

FIG. 14 is a view showing a detailed execution flow of the variable importance degree analysis unit 1152. Although FIG. 14 shows an importance degree analysis flow based on degree centrality, transition probability matrix eigenvector centrality or eigenvector centrality may also be used. Processing starts in step S11520. In step S11521, the variable ID is initialized. In step S11522, the link ID is initialized. In step S11523, whether the analysis target link includes an analysis target variable or not is determined. If the analysis target link includes an analysis target variable, 1 is added to the degree centrality of the variable in step S11524. If the analysis target link does not include an analysis target variable, the processing goes to step S11525. In step S11525, whether the link ID of the analysis target is of the final link or not is determined. If the link ID is of the final link, the processing goes to step S11527. If the link ID is not of the final link, the processing goes to step S11526. In step S11526, 1 is added to the link ID and the processing goes back to step S11523, using the next link as an analysis target. In step S11527, whether the analysis target variable is the final variable or not is determined. If the analysis target variable is the final variable, the processing goes to step S11529. If the analysis target variable is not the final variable, the processing goes to step S11528. In step S11528, 1 is added to the variable ID and the processing goes back to step S11522, using the next variable as an analysis target. In step S11529, the processing is completed.

Figures 15, 16, 17:
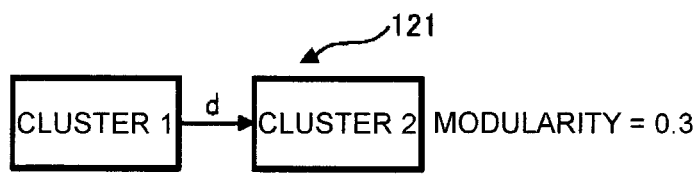
FIG. 15 It is a view showing the configuration of variable importance degree data 117.
FIG. 16 It is a view showing the configuration of variable importance degree data 117.
FIG. 17 It is a view showing a display on a variable dependence relation cluster display unit 12.

FIG. 15 is a view showing a variable importance degree table 1171, which is the detailed configuration of the variable importance degree data 117. The variable importance degree table 1171 shows degree centrality calculated based on the detailed execution flow of the variable importance degree analysis unit 1152 shown in FIG. 14, as variable importance degree. For example, the variable a is connected to two variables b and c by the link and the degree of importance thereof is 2. Also, the variable d is connected to three variables b, c, e by the link and therefore the degree of importance thereof is shown as 3.

FIG. 16 is a view showing a variable importance degree table 1172, which is the detailed configuration of the variable importance degree data 117. The variable importance degree table 1172 shows transition probability matrix eigenvector centrality as variable importance degree.

FIG. 17 is a view showing an illustration screen 121 of variable dependence relation clusters on the variable dependence relation cluster display unit 12. It is shown that the variable dependence relation network is made up of a cluster 1 and a cluster 2 and that the variable d is a parameter in the link connecting the cluster 1 and the cluster 2. Also, a modularity index in this cluster configuration is shown.

Figure 18:
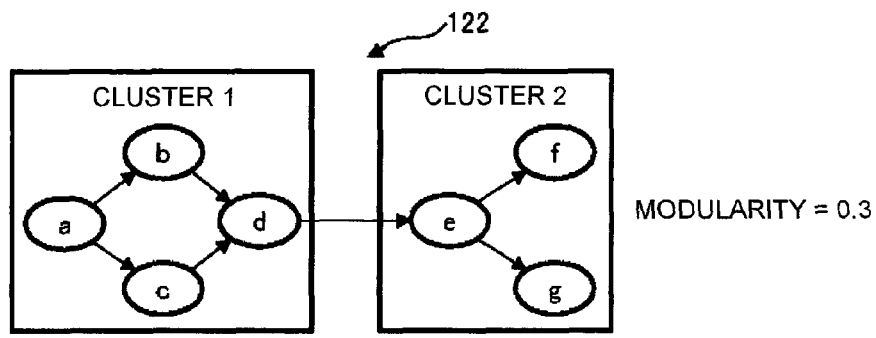
FIG. 18 It is a view showing a display on the variable dependence relation cluster display unit 12.

FIG. 18 is a view showing an illustration screen 122 of variable dependence relation clusters on the variable dependence relation cluster display unit 12. The variable dependence relation network, and variables classified into a cluster 1 and a cluster 2 are shown. Also, a modularity index in this cluster configuration is shown.

Figure 19:
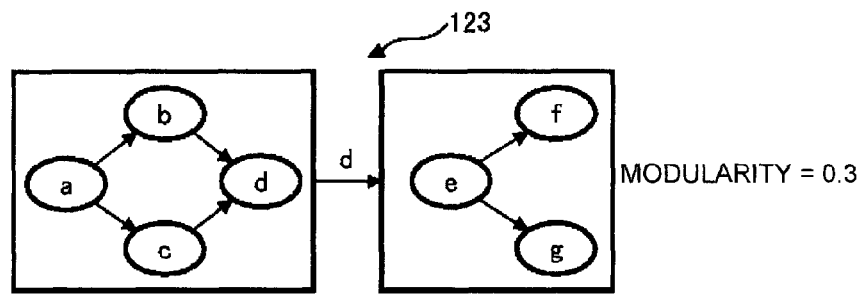
FIG. 19 It is a view showing a display on the variable dependence relation cluster display unit 12.

FIG. 19 is a view showing an illustration screen 123 of variable dependence relation clusters on the variable dependence relation cluster display unit 12. It is shown that the variable dependence relation network is made up of a cluster 1 and a cluster 2 and that the variable d is a parameter in the link connecting the cluster 1 and the cluster 2. The inter-variable dependence relation network within each cluster is hierarchically shown. Also, a modularity index in this cluster configuration is shown.

Figure 20:
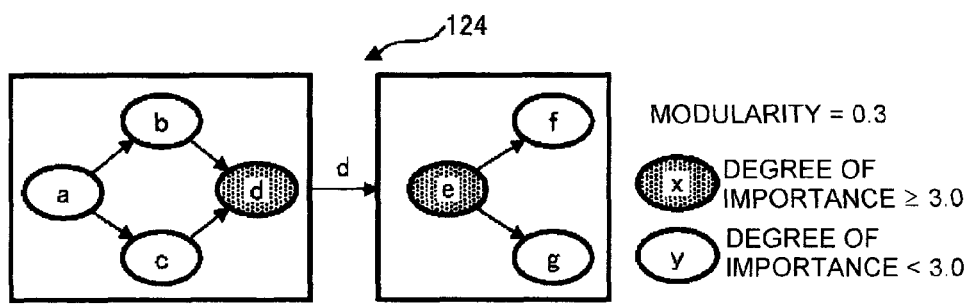
FIG. 20 It is a view showing a display on the variable dependence relation cluster display unit 12.

FIG. 20 is a view showing an illustration screen 124 of variable dependence relation clusters on the variable dependence relation cluster display unit 12. It is shown that the variable dependence relation network is made up of a cluster 1 and a cluster 2 and that the variable d is a parameter in the link connecting the cluster 1 and the cluster 2. The inter-variable dependence relation network within each cluster is hierarchically shown. Moreover, referring to the variable importance degree table 1171, a variable with a variable importance degree of 3.0 or higher is shown in black and a variable with a variable importance degree lower than 3.0 is shown in white. Also, a modularity index in this cluster configuration is shown.

Figure 21:
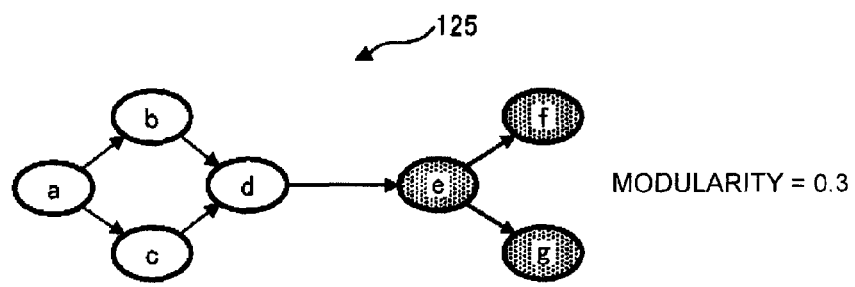
FIG. 21 It is a view showing a display on the variable dependence relation cluster display unit 12.

FIG. 21 is a view showing an illustration screen 125 of variable dependence relation clusters on the variable dependence relation cluster display unit 12. In the variable dependence relation network, variables classified into a cluster 1 are shown in white and variables classified into a cluster 2 are shown in black. Also, a modularity index in this cluster configuration is shown.

Figure 22:
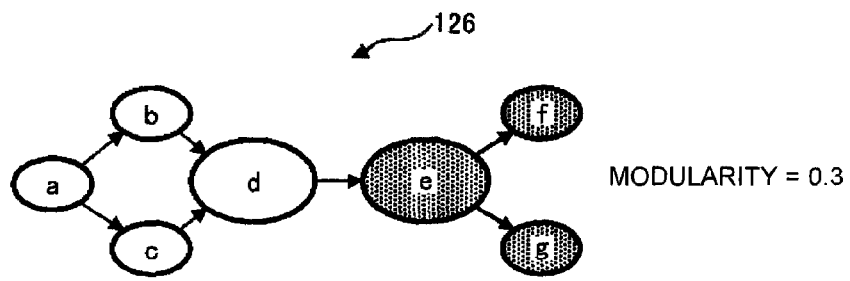
FIG. 22 It is a view showing a display on the variable dependence relation cluster display unit 12.

FIG. 22 is a view showing an illustration screen 125 of variable dependence relation clusters on the variable dependence relation cluster display unit 12 shown in FIG. 21. In the variable dependence relation network, variables classified into a cluster 1 are shown in white and variables classified into a cluster 2 are shown in black. Moreover, referring to the variable importance degree table 1171, a variable with a greater variable importance degree is displayed in a larger size. Also, a modularity index in this cluster configuration is shown.

Moreover, the software division in the source code 3 and the division based on variable dependence relation clusters according to this embodiment may be displayed simultaneously. That is, the division of variables classified into the files called the source file 31 and the source file 32 is handled as cluster division in the input state and displayed by the variable dependence relation cluster display unit. Also, modularity in the division state of variables classified into the files called the source file 31 and the source file 32 is calculated and displayed. By employing this configuration, the configuration of a source file to be an analysis target can be compared with an ideal division based on the variable dependence relation clusters and can be used to verify the software. In this case, the difference in division result may be highlighted.

Figure 23:
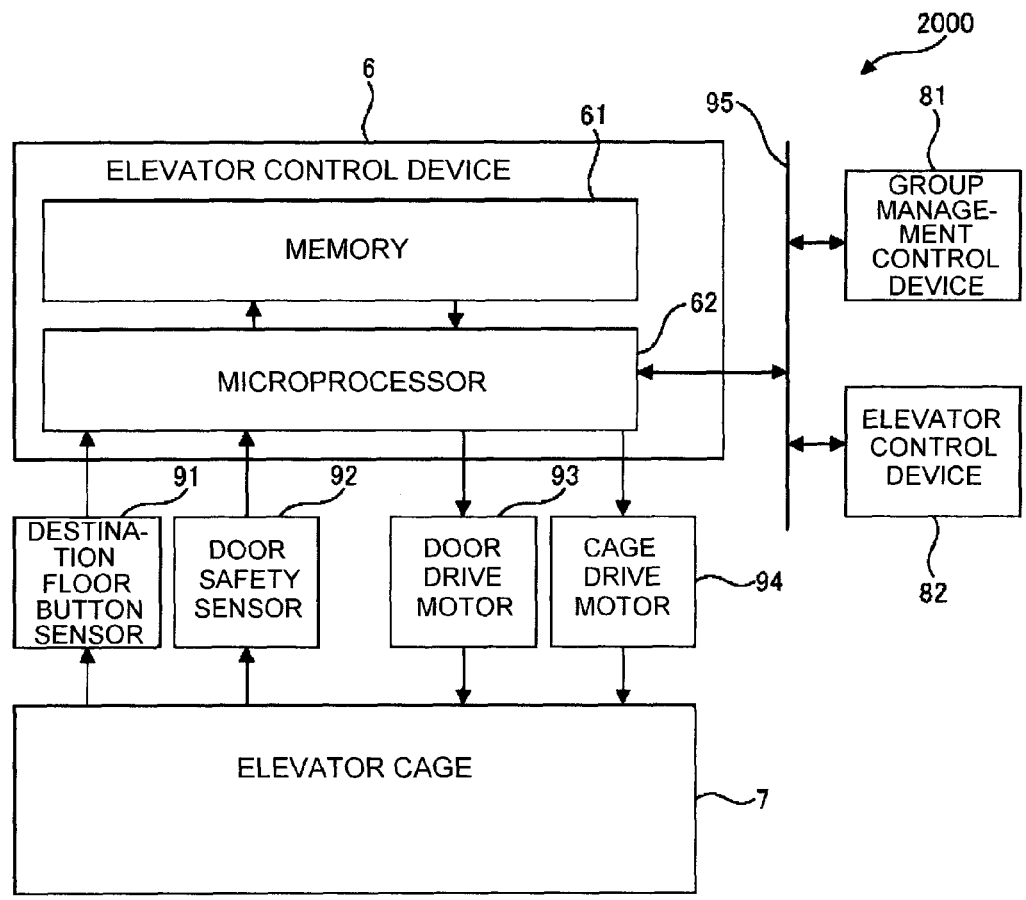
FIG. 23 It is a view showing the configuration of an elevator control device 6.

FIG. 23 is a view showing the configuration of an elevator system 2000. The elevator system 2000 includes elevator control device 6, an elevator cage 7, a group management control device 81 which controls coordinated operation of plural elevators, an elevator control device 82 which controls other elevator cages, a destination floor button sensor 91 which detects that a destination floor button is pressed, a door safety sensor 92 which detects that something is caught in the door, a door drive motor 93 to open and close the door, a cage drive motor 94 to move the cage up and down, and a communication line 95 to carry out communication between the elevator control device 6, the group management control device 81 and the elevator control device 82. The source code 3 analyzed, displayed and verified in the software maintenance supporting device 1 is converted to executable software by the source code compiler unit 13 and transferred to the memory 61. Based on the executable software stored in the memory 61, the microprocessor 62 operates the destination floor button sensor 91 detecting that the destination floor button is pressed which is an input and output device, the door safety sensor 92 detecting that something is caught in the door, the door drive motor 93 to open and close the door and the cage drive motor 94 to move the cage up and down, and controls the elevator cage 7.

As described above, in this embodiment, the variable dependence relation cluster display unit 12 displays a cluster division pattern with high modularity, that is, having many variable dependence relations within clusters and few variable dependence relations between clusters, based on the dependence relations between variables in the source code 3. Thus, the structure of software loaded in an electronic control device can be extracted and outputted in view of variable dependence relation.

DESCRIPTION OF REFERENCE NUMERALS AND SIGNS

1 software maintenance supporting device
2 computer
3 source code
4 display device
5 input device
6 elevator control device
11 source code analysis unit
12 variable dependence relation cluster display unit
13 source code compiler unit
14 control unit
61 memory
62 microprocessor
1000 software maintenance supporting device and electronic control device verified by the same

The invention claimed is:

1. A software maintenance supporting device comprising a hardware processor and source code analysis means for analyzing a source code of software loaded in an electronic control device to control a control target, and outputting analysis information related to a variable in the source code, wherein the source code comprises a plurality of functions, the source code analysis means includes variable dependence relation analysis means for analyzing a relationship of influence between variables that are included in different ones of the functions, and extracting variable dependence relation data based on the analysis, and variable dependence relation network analysis means having variable cluster analysis means for extracting variable cluster data in which a set of all variables is divided into variable clusters including at least one variable, based on the variable dependence relation data, and the device includes variable dependence relation display means for illustrating an inter-variable dependence relation as a directed graph in which variables are expressed as nodes and the dependence relation is expressed as a link, based on the variable dependence relation data, and highlighting variables belonging to the same cluster based on the variable cluster data, wherein the variable dependence relation display means displays a modularity index calculated based on the number of variable dependence relations within the divided clusters and the number of variable dependence relations between the divided clusters, based on the variable cluster data.

2. The software maintenance supporting device according to claim 1, wherein the variable dependence relation display means displays variables belonging to the same variable cluster in the same color, based on the variable cluster data.

3. The software maintenance supporting device according to claim 1, wherein the variable dependence relation display means illustrates a cluster dependence relation network in which each variable cluster is expressed as a node and a variable dependence relation between variable clusters is expressed as a link, based on the variable dependence relation data and the variable cluster data.

4. The software maintenance supporting device according to claim 3, wherein the variable dependence relation display means displays a variable name to be a start point of a link expressing a variable dependence relation between variable clusters, on the link.

5. The software maintenance supporting device according to claim 3, wherein the variable dependence relation display means illustrates a variable dependence relation between variables belonging to the same variable cluster, within the cluster, based on the variable dependence relation data and the variable cluster data.

6. The software maintenance supporting device according to claim 5, wherein the variable dependence relation display means illustrates a variable with a high degree of importance in a size equal to or greater than a variable with a low degree of importance, based on variable importance degree data.

7. The software maintenance supporting device according to claim 5, wherein the variable dependence relation display means changes a display color according to a value of a degree of importance, based on variable importance degree data.

8. The software maintenance supporting device according to claim 1, wherein the variable dependence relation network analysis means includes variable importance degree analysis means for extracting variable importance degree data indicating a degree of importance of each variable, based on the variable dependence relation data.

9. The software maintenance supporting device according to claim 1, wherein the source code analysis means includes
analysis target setting means for selecting a variable to be an analysis target.

10. The software maintenance supporting device according to claim 1, wherein the variable cluster analysis means includes
cluster analysis technique selecting means for selecting at least one cluster analysis technique of link betweenness centrality community analysis and eigenvector communication analysis.

11. The software maintenance supporting device according to claim 8, wherein the variable importance degree analysis means includes importance degree analysis technique selecting means for selecting at least one analysis technique of degree centrality, transition probability matrix eigenvector centrality, and eigenvector centrality.

12. The software maintenance supporting device according to claim 1, comprising a source code compiler device which carries out conversion to executable software based on the source code.

13. An electronic control device comprising the software maintenance supporting device according to claim 12 and transferring executable software.

* * * * *